United States Patent [19]
Haydon

[11] Patent Number: 5,874,726
[45] Date of Patent: Feb. 23, 1999

[54] PROBE-TYPE NEAR-FIELD CONFOCAL HAVING FEEDBACK FOR ADJUSTING PROBE DISTANCE

[75] Inventor: Philip G. Haydon, Ames, Iowa

[73] Assignee: Iowa State University Research Foundation, Ames, Iowa

[21] Appl. No.: 731,093

[22] Filed: Oct. 9, 1996

Related U.S. Application Data

[60] Provisional application No. 60/004,990 Oct. 10, 1995.
[51] Int. Cl.[6] .............................. G01J 1/20; G01N 21/64
[52] U.S. Cl. .................................... 250/201.1; 250/201.3; 250/461.2; 359/368
[58] Field of Search .............................. 250/201.1, 201.3, 250/216, 227.26, 306, 307, 458.1, 461.2; 359/368, 385

[56] References Cited

U.S. PATENT DOCUMENTS

| | | |
|---|---|---|
| Re. 34,331 | 8/1993 | Elings et al. . |
| 4,353,618 | 10/1982 | Hagner et al. . |
| 4,662,747 | 5/1987 | Isaacson et al. . |
| 4,871,938 | 10/1989 | Elings et al. . |
| 4,884,881 | 12/1989 | Lichtman et al. . |
| 4,889,988 | 12/1989 | Elings et al. . |
| 4,917,462 | 4/1990 | Lewis et al. . |
| 4,919,516 | 4/1990 | Petran et al. . |
| 4,927,254 | 5/1990 | Kino et al. . |
| 4,947,034 | 8/1990 | Wickramasinghe et al. . |

(List continued on next page.)

OTHER PUBLICATIONS

Carrington et al., "Superresolution Three–Dimensional Images of Fluorescence in Cells with Minimal Light Exposure", Science, vol. 268, pp. 1483–1487 (9 Jun. 1995).

Trautman, et al., "Near–Field Spectroscopy of Single Molecules at Room Temperature", Nature, vol. 369, pp. 40–42 (5 May 1994).

Ambrose, et al., "Alterations of Single Molecule Fluorescence Lifetimes in Near–Field Optical Microscopy", Science, vol. 265, pp. 364–367 (15 Jul. 1994).

Betzig, et al., "Near–Field Optics: Microscopy, Spectroscopy, and Surface Modification Beyond the Diffraction Limit", Science, vol. 257, pp. 189–195 (10 Jul. 1992).

Trautman, et al., "Image Contrast in Near–Field Optics", J. Appl. Phys. 71, pp. 4659–4663 (15 May 1992).

Betzig, et al., "Polarization Contrast in Near–Field Scanning Optical Microscopy", Applied Optics, vol. 31, No. 22, pp. 4563–4568 (1 Aug. 1992).

*Primary Examiner*—Edward P. Westin
*Assistant Examiner*—Kevin Pyo
*Attorney, Agent, or Firm*—Fitch, Even, Tabin & Flannery

[57] ABSTRACT

A method and apparatus for achieving optical microscopic images and monitoring metabolic processes of living biological specimens such as cells at a resolution superior to the diffraction limit is disclosed. A primary difficulty in performing near-field scanning optical microscopy of living cells, e.g., determining the separation between the cell surface and the illuminating probe tip, is overcome by using a photon-density feedback method in which a fluorescent dye signal strength is monitored in the cell as the tip is brought to the cell surface, and registering a maximum value, at which point the tip begins to dimple the cell surface and can get no closer to the dye. Thereafter the tip is either maintained in contact with the membrane for point measurements of metabolic processes or is withdrawn a selected distance from the surface as measured against a corresponding decrease in the fluorescent dye signal strength The signal strength serves as a photon-density feedback for maintaining the probe tip at a constant elevation above the cell surface as scanning is performed or time-series measurements of metabolism are recorded. Advantageously, the apparatus also combines confocal means in the form of a pin-hole or the like for high-fidelity light detection in three dimensions from the cell surface in the near-field of the probe tip.

27 Claims, 4 Drawing Sheets

U.S. PATENT DOCUMENTS

| | | |
|---|---|---|
| 5,004,307 | 4/1991 | Kino et al. . |
| 5,018,865 | 5/1991 | Ferrell et al. . |
| 5,051,646 | 9/1991 | Elings et al. . |
| 5,105,305 | 4/1992 | Betzig et al. . |
| 5,120,953 | 6/1992 | Harris . |
| 5,157,251 | 10/1992 | Albrecht et al. . |
| 5,260,622 | 11/1993 | West . |
| 5,272,330 | 12/1993 | Betzig et al. . |
| 5,286,970 | 2/1994 | Betzig et al. . |
| 5,286,971 | 2/1994 | Betzig et al. . |
| 5,288,996 | 2/1994 | Betzig et al. . |
| 5,291,775 | 3/1994 | Gamble et al. . |
| 5,294,790 | 3/1994 | Ohta et al. . |
| 5,296,700 | 3/1994 | Kumagai . |
| 5,296,703 | 3/1994 | Tsien . |
| 5,304,810 | 4/1994 | Amos . |
| 5,306,919 | 4/1994 | Elings et al. . |
| 5,307,203 | 4/1994 | Hill . |
| 5,308,974 | 5/1994 | Elings et al. . |
| 5,319,960 | 6/1994 | Gamble et al. . |
| 5,321,446 | 6/1994 | Massig et al. . |
| 5,323,009 | 6/1994 | Harris . |
| 5,324,633 | 6/1994 | Fodor et al. . |
| 5,334,830 | 8/1994 | Fukuyama et al. . |
| 5,340,981 | 8/1994 | De Fornel et al. . |
| 5,351,152 | 9/1994 | Kuo et al. . |
| 5,354,985 | 10/1994 | Quate . |
| 5,362,963 | 11/1994 | Kopelman et al. . |
| 5,371,588 | 12/1994 | Davis et al. . |
| 5,376,790 | 12/1994 | Linker et al. . |
| 5,377,002 | 12/1994 | Malin et al. . |

# PROBE-TYPE NEAR-FIELD CONFOCAL HAVING FEEDBACK FOR ADJUSTING PROBE DISTANCE

This application claims the benefit of U.S. Provisional Application No. 60/004,990 filed Oct. 10, 1995.

FIELD OF THE INVENTION

The invention relates to microscopes which yield images from collecting near-field light from sub-wavelength illumination probes to attain superior resolution beyond the diffraction limit of the illuminating light. In particular, the invention relates to confocal near-field microscopy of living biological cells.

BACKGROUND OF THE INVENTION

One long-standing limitation on the resolution achievable in optical-regime microscopy has been the diffraction limit of the illuminating light. Details having size equal to or less than half the wavelength of the illuminating light are beneath the resolving powers of traditional optical microscopes. Thus, details in the range of 250 nanometers or smaller cannot be resolved using conventional focal optical microscopy.

In recent years, a solution has been provided to this problem by near-field scanning optical microscopy (NSOM). This technology permits optical resolution below the normal diffraction limit by using a fiber optic light guide to direct illuminating light from an aperture with dimensions of less than half the wavelength of the light (typically about 20–100 nanometers) at the light guide tip onto an equally small area of the specimen. The tip is located very close to the specimen, so that the specimen lies in the near-field region of the light emanating from the tip, and diffraction limitations play no role. The near field is generally the area within less than a wavelength or so of the aperture from which the illuminating light emanates.

The illumination is measured by collecting either reflected, transmitted or fluorescent light, and that measurement yields a single pixel of the microscopic image. The sample is typically scanned in a raster pattern across the surface of the specimen to yield an image having a pixel resolution on the order of the tip dimensions, namely about 20–50 nanometers, which lies below the normal diffraction barrier. Some examples of an NSOM are disclosed in U.S. Pat. No. 4,917,462 to Lewis et al., and in U.S. Pat. Nos. 5,272,330 and 5,286,970 to Betzig, et al.

U.S. Pat. No. 4,917,462 to Lewis et al. discloses an NSOM apparatus involving a metal-coated glass pipette having a thin tip. Lewis teaches the application of an electrical potential between the pipette and the stage, resulting in a measurable current to provide a feedback signal used to determine the distance between aperture and object, see col. 11, l. 27–52, although he also mentions the possibility of using light for feedback, col. 11, line 53 et seq. Lewis teaches general epi-fluorescence illumination of the specimen, although he also mentions the possibility of providing light through the pipette to the specimen.

In NSOM, it may be preferable to use a fiber optic light guide with a fine tip in order to provide more light directly to the specimen than could be provided through a pipette. See U.S. Pat. Nos. 5,272,330 and 5,286,970 to Betzig, et al. Desirably, illuminating light will be directed from a very small aperture at the light guide tip onto a very small area of a nearby specimen.

A significant difficulty in NSOM has been determining when the fiber optic light guide tip has reached a location close enough to the specimen that the specimen surface lies within the near-field of the illuminating light. Furthermore, the tip must be maintained at a constant elevation above the surface being scanned. Various feedback techniques have been developed in the field to maintain this tip-sample registration. Generally, the light guide tip is moved toward the specimen until the tip is in the immediate vicinity of the specimen. Then, using a "shear-force" feedback method, the tip is held within 5–20 nanometers of the sample. The scanning is then performed by mechanically moving the sample under the tip and registering light reflectance on transmission values.

These techniques generally work well for relatively dry, hard and flat samples, but do not work well with biological specimens, which are soft, have greater topological variation, and do not advantageously yield mechanical and electrical signals which can be measured to determine the proximity of the tip to the specimen surface. Furthermore, these techniques tend to have a destructive effect on the biological material.

For example, using "shear force" feedback, the tip is vibrated side-to-side at its resonant frequency as it is brought down toward the surface of the specimen. A phase shift or damping of the vibration caused by forces of interaction between the tip and the sample is used as a measure of separation to hold the tip at a constant distance from the sample. This technique works well for dry, relatively flat surfaces. Unfortunately, such a technique, if used on living cells in solution, can result in damage to biological cell membranes from the side-to-side vibration. In U.S. Pat. No. 5,354,985 to Quate, a cantilever light guide is disclosed which determines proximity to the specimen surface by measuring changes in the resonant vibration frequency of the cantilever. As the cantilever aperture tip approaches the surface of the specimen, Van der Waals forces influence the resonant frequency. In an alternative embodiment disclosed in Quate, the cantilever is brought into contact with the surface by measuring deflection of the cantilever from a rest position by the force of the surface. The cantilever is then dragged over the surface while maintaining a constant force on it.

The microscope of Quate works well with well-defined, crystalline surfaces of relatively homogenous composition. However, biological specimens such as cells have surfaces littered with structures which often extend relatively far from the cell membrane. The apparatus of Quate is not well-adapted to measure proximity to the cell membrane because these structures also impart Van der Waals forces affecting the resonant frequency of the cantilever. Furthermore, the surface of the cell is composed of a wide variety of molecules with varying Van der Waal attraction forces. No consistent or useful scanning of a living biological specimen can be carried out using the apparatus of Quate.

U.S. Pat. No. 5,340,981 to De Fornel et al. discloses a means of bringing a NSOM within the near-field of a specimen using the electromagnetic coupling between the incident illumination radiation and the reflected radiation. The invention is best suited for coupling the modes of the reflected light with the illumination light when the surface being scanned is well-defined and preferably near-crystalline Biological cells with their highly heterogeneous surface structures do not present the kind of surfaces from which the reflective modes used in De Fornel can be advantageously obtained. Furthermore, the form of microscopy described by DeFornell specifically relates to reflection and not fluorescence microscopy.

Another genre of microscopes related to NSOMs is scanning tunneling microscopes. Again, the technique used in the scanning tunneling microscope is suited for flat, dry specimens, but not for living biological cells. Scanning tunneling microscopy utilizes tunneling electrons as a signal source to indicate distance between the probe tip and the specimen. As the tip approaches the specimen, the tunneling phenomenon of electrons becomes measurable and increases with increasing proximity. However, an electrically conductive specimen is required for this kind of microscopy.

In the field of biological microscopy, it is desirable to achieve nanometer-scale optical resolution in order to study cellular metabolism, and in particular cell membrane metabolism. Metabolism is studied both in terms of the spatial distribution of molecular structures and also in terms of the time-variation of molecular concentrations. An example of the need for such optical resolution is the study of ion channels in the cell membrane. Such membrane structures have dimensions on the order of 1–30 nanometers. The flow of ions across the membrane into the cell is desirably monitored by measuring the fluorescence of an indicator activated in the presence of the ions. Traditional microscopy produces a volume-averaged measurement, since the contribution to fluorescence by indicators just below the cell membrane is swamped by the dye throughout the cell. If it were possible to map fluorescence locally at tens-of-nanometers resolution, the volume-averaged effect would be avoided, and it would be possible to map the distribution of functional ion channels and potentially individual molecules over the cell membrane.

In view of the above prior techniques, it is apparent there are obstacles to sub-diffraction limit microscopic resolution in imaging living biological cells. The techniques described above generally require the specimen to be flat, dry, well-defined at the surface, hard or crystalline. When practiced on living biological cells, the techniques either yield inaccurate results or may damage a living biological cell.

A further problem in optical microscopy of biological specimens has been that virtually all of the above-described techniques are designed to measure only the surface topology of a specimen, usually for fractures or inconsistencies in crystalline structure. None of the above techniques is suitable for monitoring metabolic activity through time, for monitoring cortical concentrations of fluorescent-tagged molecules at the cell membrane, or for detecting fluorescence-labelled molecules associated with the cell membrane.

What is needed is a means for generating accurate microscopic images of living biological structures below the 250 nanometer resolution limitation of conventional optical microscopy, and preferably in the range of tens of nanometers More importantly, such a needed microscopic apparatus must not damage the biological structures, and must be able to provide an accurate image of metabolic activity without interfering with such activity.

SUMMARY OF THE INVENTION

An improved near-field microscope and method for its use are provided for obtaining images of living biological specimens, having a spatial resolution greater than that obtainable at the diffraction limit of optical light. Spatial resolutions on the order of 20 nanometers or better can be obtained with the microscope and method of the present invention, affording imaging of individual protein complexes and ion channels. Advantageously, the living biological specimen is not damaged by the use of the present invention, and metabolic activity can be monitored over space and time.

A probe is provided to conduct light from a light source to the probe tip, which tapers to a light-emitting end having a width on the order of the image resolution, e.g., about 20 nanometers. Alternatively, a laser can be used as a light source. The microscope has means for coarse adjustment of the location of the probe tip in the plane above the region of interest of the living biological specimen, such as a particular region of the surface of a living cell. The biological specimen is stained with at least one fluorescent dye disposed to fluoresce upon exposure to the source light emanating from the probe tip end. One problem with biological samples is that they have significant thickness beyond the near-field such that excitation photons that escape this near-field can cause fluorescence in the far-field. The microscope further has a light-receiving means, preferably confocal, which can be aligned directly below the light-emitting probe tip, for selectively receiving light from the near-field region of the probe tip. Within the light-receiving means are means for measuring the strength or quantity of light thus received at wavelengths of interest, and producing a signal indicative thereof.

The probe tip and the surface of the biological specimen are brought together in a vertical direction with a vertical adjustment means. The vertical adjustment means is preferably responsive to a feedback signal generated from the light-receiving means indicative of the strength of the fluorescent light signal. This fluorescent light signal reaches a maximum as the probe tip contacts the specimen surface, since the probe tip can get no closer than this to the fluorescent dye in the cell. Upon reaching a maximum fluorescent light signal, the probe tip is either maintained in this position or is backed off in the vertical direction, either to a known distance obtained from calibration of the vertical adjustment means, or to a distance at which the fluorescent signal drops off to some selected fraction of its maximum.

The invention provides for scanning the probe tip in a raster pattern over the surface of the specimen at the backed-off distance, or for moving the specimen beneath the probe tip in a raster pattern. Vertical adjustment of the probe tip location for maintaining a constant fluorescent signal strength can be used to topographically map the scanned surface. Additionally, a second fluorescent dye attached to molecules of interest, disposed to fluoresce at a second wavelength upon exposure to the source light, can be used in the specimen, and the strength of this fluorescent light signal can be measured as the probe is scanned over the specimen at a constant backed-off distance to map the concentration of the molecules of interest in the immediate vicinity of the surface of the cell.

An image is formed from measurements taken along a row, and from regularly spaced adjacent rows. Each image point or pixel represents the light signal from near-field fluorescence at the probe tip location, or represents the calibrated vertical displacement of the tip necessary to maintain a constant fluorescent signal from the probe tip location.

The microscope of the present invention can also be used to obtain a time-series image of metabolic activity at a small region of the specimen surface on the order of the probe tip dimension. Instead of scanning the probe tip in a raster pattern, the fluorescent signal can be monitored over time to indicate the ebb or flow of molecules tagged with fluorescent dye in the near-field of the probe tip.

Advantageously, the present invention allows for imaging of living biological specimens—such as small regions of living cell surfaces—at high resolution, without causing damage to the specimen surface.

A further advantage afforded by the present invention is time-series imaging of the metabolic activity of living biological specimens at a spatial resolution previously unattainable because of the limitations of prior art near-field microscopes and the optical diffraction barrier.

Yet another advantage of the present invention is improved light signal resolution of light emanating from the near-field of the probe tip, including both source light and fluorescent light, by the use of confocal means in the light-receiving means.

These and other advantages of the present invention are yet more evident from a reading of the following detailed description in conjunction with the figures.

DESCRIPTION OF THE PREFERRED EMBODIMENT

Figure 1:
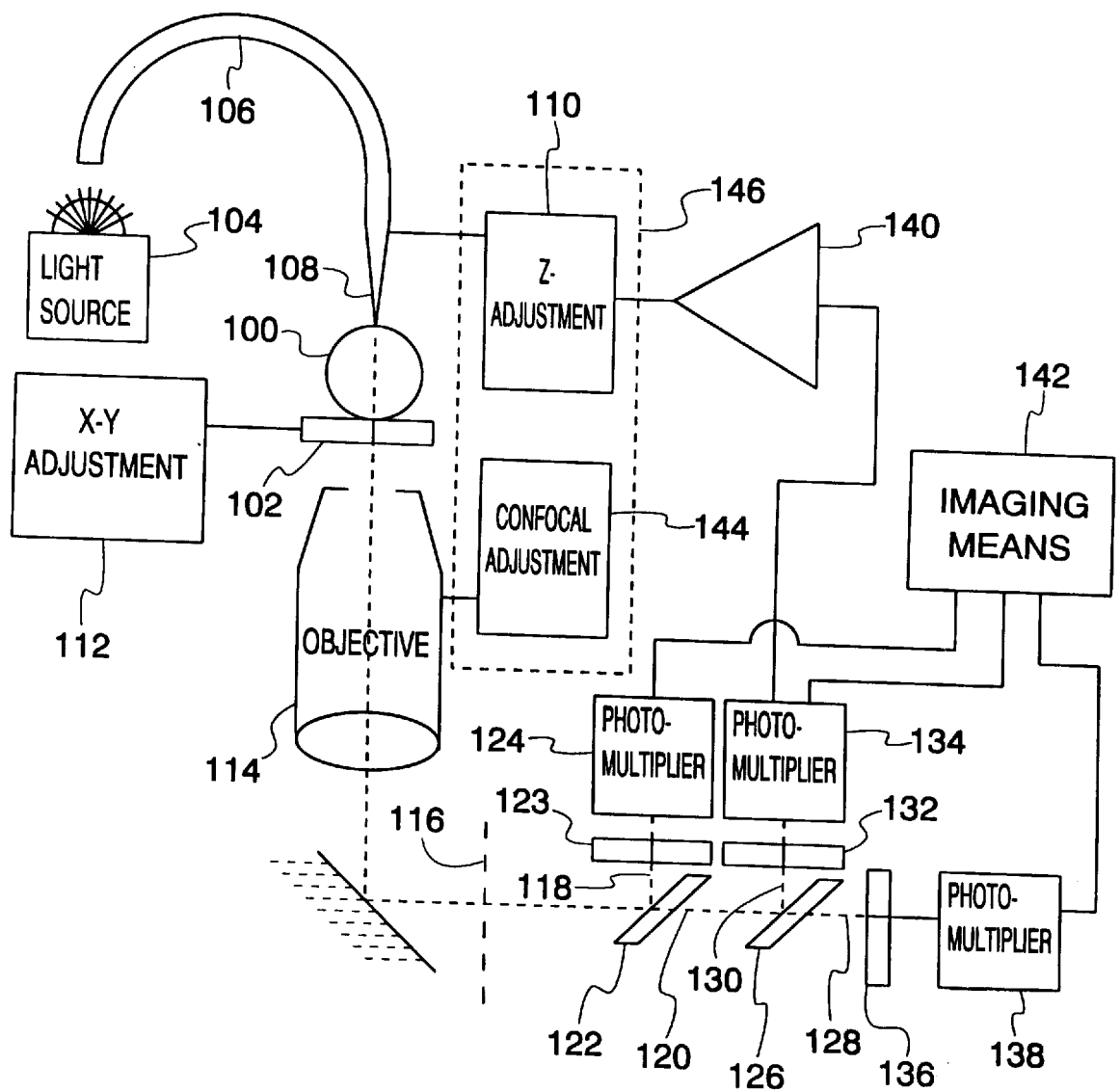
FIG. 1 is a schematic view of the present invention.

The general operation of the present invention can be ascertained from FIG. 1. Therein is shown a living biological specimen 100, such as a cell in solution, the surface of which is to be microscopically imaged. The cell has been stained with two dyes, which both may be excited by one kind of illumination light and which fluoresce at different wavelengths. Alternatively, different dyes may be excited by different wavelengths of light that are delivered from the illuminating source. One dye may pervade the cell uniformly, and the other dye serves to tag molecules of interest in the cell.

The cell is mounted on a stage 102, which contains an environment suitable to the metabolism of the cell of interest. A light source 104 provides illuminating light capable of causing the two dyes to fluoresce at their respective wavelengths. The light may be laser light. The illuminating light is guided by fiber optic probe 106 to the specimen 100. Probe 106 tapers at its end to a fine tip 108 which has an optically transmissive aperture of a width on the order of the maximum imaging resolution, about 20 nanometers to 50 nanometers with current fiber manufacturing capabilities. As probes with smaller apertures are developed, they may equally well be used in the current invention to achieve yet better resolutions. Furthermore, other types of sub-wavelength illumination devices may also be used in place of the optical fiber. With an optical fiber, light from source 104 is directed out the aperture at tip 108.

Z-adjust 110 is provided for adjusting the vertical separation of the probe tip 108 and the specimen 100. X-y-adjust 112 is provided to move stage 102 and the specimen 100 contained therein in the x-y plane perpendicular to the z-adjust axis for moving the specimen 100 with respect to the tip 108 for x-y scanning. Of course, any means of adjusting the relative position of the probe tip and the specimen surface in the three spatial dimensions, even if incorporated into a single adjusting device, can be used in the present invention.

Confocal light detection means of the present invention comprises an objective 114 disposed to receive light transmitted through the specimen 100, and a pin-hole aperture 116 for preferentially receiving light which comes from the vicinity of the cell surface in the near-field region around the probe tip 108. Such light comprises illuminating light from light source 104, and fluorescent light from the two dyes in the cell. Objective 114 may be manually adjustable, so that the appropriate focal section of the cell or specimen can be selected by viewing through the objective with an eyepiece. Objective 114 may also be focused on the appropriate focal section automatically, by conventional means known in the art, such as sensitive motors controlled by a personal computer or the like, and the image from the objective preferably may be viewed with a camera and a video monitor. Pin-hole 116 lies some distance beyond objective 114, and is aligned with the light coming from the near-field region of the probe tip 108.

Light passing through pin-hole 116 is split into two beams 118 and 120 at mirror 122, which is partially reflective and partially refractive without regard to wavelength.

Beam 118 is directed through a bandpass filter 123 which selects for the wavelength of the illuminating light from light source 104, and into a photomultiplier tube 124. Photomultiplier tube 124 thus provides an electrical signal indicative of the amount of illuminating light received through pin-hole 116. This signal can be used to align the pin-hole 116 with the tip 108. It may be fed to any number of alternative devices (not shown) for observing a peak value indicative of proper alignment. The use of this signal and the confocal aperture is discussed in greater detail below.

Beam 120 is directed to a second partially reflective, partially refractive mirror 126 which again splits the remaining light into two beams 128 and 130. Beam 130 passes through bandpass filter 132 which selects for the wavelength of the fluorescent dye which uniformly pervades the cell, and into a second photomultiplier tube 134. Beam 128 passes through bandpass filter 136 which selects for the wavelength of the other fluorescent dye which tags the molecules of interest in the cell, and into a third photomultiplier tube 138. The electrical output signals from photomultiplier tubes 134 and 138 are indicative of the amounts of fluorescence of the corresponding fluorescent dyes.

The electrical output signal from photomultiplier tube 134 is fed into feedback means 140, which is disposed to monitor the signal to register a maximum value indicative of a maximum degree of fluorescence achieved in the fluorescent dye which uniformly pervades the cell. Illuminating light emanating from probe tip 108 generally diffracts widely in the far-field and causes scattered fluorescence of the uniformly distributed dye. Most of this fluorescence fails to enter the pin-hole 116 of the confocal means. However, as the probe tip 108 is brought closer to the cell membrane by z-adjust 110, the dye in the cell receives more concentrated illuminating light and fluoresces in a more concentrated manner in the region upon which the objective 114 and pin-hole 116 are focused. This maximum degree of fluorescence registered by feedback means 140 therefore indicates contact between the probe tip 108 and the cell membrane, because the probe tip 108 cannot get any closer to the dye in the cell, the surface of which dimples if the tip 108 is moved further downward. This method of registering contact between the fiberoptic light probe and the cell membrane is referred to as "photon-density feedback."

Once the maximum fluorescence signal is registered from the output of photomultiplier tube 134, feedback means 140 is disposed to cause z-adjust 110 to raise the tip 108 off the cell surface to some selected height at which the tip 108 is no longer touching the surface, but the surface still lies within the near-field of the light emanating from the probe tip. This can be determined in at least two ways. According to the first way, the feedback means is disposed to cause the z-adjust 110 to withdraw the tip until the fluorescence signal from photomultiplier tube 134 drops off to a selected fraction of the maximum value. According to the second way, the z-adjust 110 is calibrated with vertical displacement generally, and the tip 108 is withdrawn a selected distance. In either case, the z-adjust is advantageously performed with piezo-electrically responsive materials or the like, which are well known in the NSOM art for the purpose of making very small displacement adjustments.

Once the tip 108 has been withdrawn to a selected height above the cell surface, x-y imaging can be performed by using x-y-adjust to move the stage 102 and the cell therein in the x-y plane with respect to the probe tip 108. As the relative position of the cell and the probe changes, and the separation between the tip 108 and the cell surface alters due to the topological variation of the cell surface, feedback means 140 causes z-adjust 110 to move the tip vertically to maintain it at a constant height above the cell surface. This may be accomplished using the signal from photomultiplier tube 134, which registers the light from the fluorescent dye which uniformly pervades the cell. If the tip 108 is backed off by using a fractional value of the signal from photomultiplier tube 134, then feedback means 140 is configured to maintain that value by adjusting z-adjust 110. If the tip is backed off a selected distance based on the calibrated movement of z-adjust 110, the signal strength from photomultipier tube 134 is registered after backing off and before adjusting x-y-adjust 112, and thereafter, as x-y-adjust 112 is adjusted, z-adjust 110 is also adjusted to maintain the signal strength from photomultiplier tube 134 at the initially registered value.

In an alternative technique, after measuring fluoresence in the near field of a cell surface at a certain x-y location, the fiber optic guide tip may be translated a significant distance, e.g., 400 nanometers, in the z-direction away from (retracted from) the cell surface. The stage may then be translated to the next desired location in the x-y plane. Next, the fiber tip may be translated in the z-direction toward (approaching) the cell until a maximum fluorescent signal (photon density feedback) is again obtained, indicating contact with or very close proximity to the cell wall. The foregoing steps may be repeated indefinitely until the desired locus of points in the x-y plane have been mapped, along with such other information as may be obtained for each such point. This alternative method may be advantageous in mapping of a specimen having major topographical structure. For a given specimen, it may be desirable for the retraction of the guide tip from the specimen to be a sufficient distance in the z-direction so that translation of the stage a predetermined distance in the x-y plane will not result in the tip contacting the specimen during the movement of the stage in the x-y plane. For example, the retraction of the tip by a distance of, e.g., 400 nanometers in the z-direction prior to translating the stage a distance of 10–200 nanometers in the x-y plane may avoid contact with (and possible damage to or punctures in) the surface of the specimen.

Imaging means 142 is provided for registering the signal from photomultiplier tube 138 to generate a map of the molecules tagged with the other fluorescent dye. In the technique where separation between the tip 108 and the cell surface is maintained constant, any variation in the signal corresponding to the molecule-tagging dye is indicative of the concentration of the tagged molecule. The image is generated from this signal as a function of x-y location.

The electrical signal from photomultiplier tube 124, representing the amplitude of illuminating light received through the pin-hole 116, can be used to initially align the pin-hole with the probe tip 108 so that they share a common z-axis, or are aligned along a single light path. Manual or electrically-driven adjustment means (not shown in the figure) may be employed to move the pin-hole 116 with respect to the probe tip 108 in the x-y plane of the projection plane of objective 114 until a maximum signal is achieved, indicating the pin-hole 116 is aligned with the probe tip 108 along a common light path.

It lies within the scope of the present invention to alternatively employ something other than a photomultiplier tube 124 for the detection of illuminating light to align the pin-hole 116 with the tip 108. Coarse alignment is possible through an eyepiece or camera which receives the image from the objective. It is preferable to use a camera in the focal plane of the objective 114 which projects the image to a video monitor for coarse alignment by a person controlling electrically-driven adjustment means, such as sensitive positioning motors controlled from a personal computer interface, or the like. Methods for controlling such sensitive motors via connection to a personal computer are generally known in the art. The pin-hole 116 is widened or removed from the focal plane of the objective 114 for coarse adjustment. The image from the focal plane of the objective 114 then can be seen in the eyepiece, or preferably on the video monitor via the camera, and the coarse adjustment may be made to narrow the pin-hole 116 onto the perceived probe tip location in the image plane, or to insert the pin-hole 116 (e.g., the disk or plate having the pin-hole aperture in it) into place at the focal plane of the objective 114 such that the pin-hole 116 is at the location of the probe tip image. Fine adjustment may be performed using a photodiode to register a value for the illuminating light transmitted through the pin-hole, where a maximum signal would indicate optimal alignment. It is also feasible to do away with the photomultiplier 124 or any other detector for detecting illumination light and align the pin-hole 116 with the tip 108 using the signal from either photomultiplier tube 134 or 138, by registering a maximum value of fluorescence as the stage 102 and tip 108 are held in place while moving the confocal means 114 in the x-y plane. These variations are discussed below.

As the stage 102 containing the specimen is moved in the x-y plane for scanning, the vertical position of the probe tip 108 and its near-field may be changed by z-adjust 110 in order to keep the probe tip 108 at a selected height above the specimen surface, causing the near-field to possibly drop out of the optimal focal length of objective 114. Therefore, a confocal adjust 144 is provided for repositioning the objective 114 in the z-direction as the scan is performed. Generally, the objective 114 and the tip 108 are moved together throughout the imaging so that as feedback means 140 causes z-adjust 110 to reposition the tip 108 vertically, it also causes confocal adjust 144 to move the objective 114 the same distance.

While the movement of the objective 114 by confocal adjust 144 may typically not be so great that it adversely affects the alignment of pin-hole 116 in its projection plane with the light from the near-field of probe tip 108, strictly speaking such movement does affect that alignment to some small degree if pin-hole 116 is not also moved in compensation. For greatest accuracy, pin-hole 116 may be moved with adjustment of objective 114 to retain the distance between objective 114 and pin-hole 116, and to maintain the location of pin-hole 116 in the projection plane of objective 114. This may be accomplished in any number of ways that are known or obvious to one skilled in the art, including placing the objective 114 and pin-hole 116 in a common housing and moving them together, or separately providing a mechanism (not shown) for adjusting the position of the pin-hole 116 in the projection plane and the size or location of the pin-hole 116.

Alternatively, the z-adjust 110 can be combined with the confocal adjust 144 into one unit 146 (shown by a dashed line in FIG. 1) which adjusts an infrastructure to which both the tip 108 and the confocal means are already fixed at optimal focal separation from one another.

Figure 2:
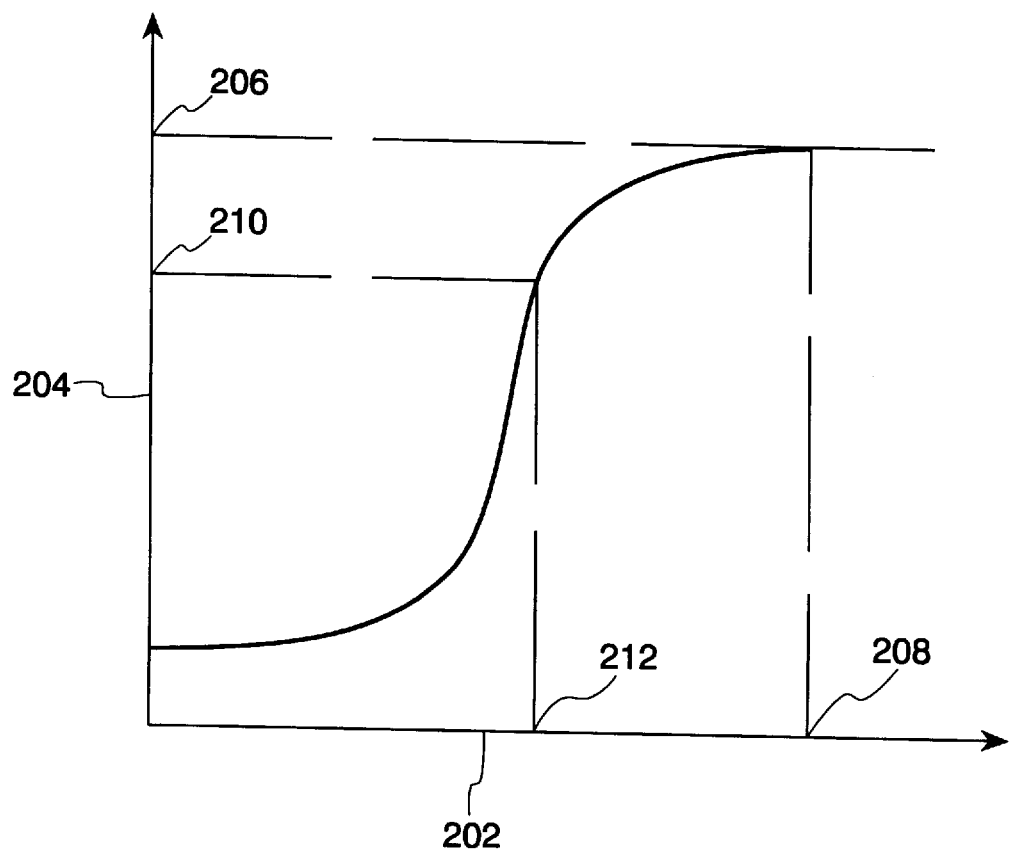
FIG. 2 is a chart showing measured fluorescence as a function of probe tip position.

The apparatus advantageously achieves an accurate determination of contact between the tip 108 and the cell surface without damaging the cell membrane. Turning to FIG. 2, a representation of the signal corresponding to the output of photomultiplier tube 134 is shown as a function of the actual vertical position of the probe tip. The horizontal axis 202 corresponds to tip position, and indicates diminishing separation between the tip and the surface from left to right on the axis. The vertical axis 204 corresponds to the signal amplitude and indicates increasing signal amplitude going up the axis. It can be seen that a maximum value of the amplitude 206 is achieved at vertical position 208, where the tip contacts the cell surface. As the tip is moved further in the z-direction, the cell surface dimples, and the fluorescence signal stays constant because the illuminating light gets no closer to the fluorescing molecules.

Once the maximum value has been determined, feedback means 140 causes the z-adjust 110 to withdraw the tip until a signal level 210 is achieved, which is some fraction of the maximum value 206. Amplitude 210 corresponds to a vertical position 212 where the tip hovers at a selected height above the cell surface, but close enough that the cell surface is in the near-field of the illuminating light.

While the invention has been described above contemplating moving the probe tip with respect to the cell surface in the z-direction, and moving the stage containing the cell with respect to the probe tip and confocal means in the x-y plane for scanning, the invention also contemplates other variations which lie within the inventive scope. For example, the probe tip and confocal means may be fixed in place, and all motion in the x-y plane as well as the z-direction undertaken by the stage containing the cell. According to yet another variation, the stage and cell may remain fixed, and the tip and confocal means may be moved in the x-y plane and the z-direction. Finally, the invention also contemplates moving the probe tip and confocal means in the x-y plane while adjusting the separation between the cell surface and probe tip in the z-direction by raising and lowering the stage containing the cell. Hardware for making these fine-scale adjustments of the positions of parts in a microscopic device are well known in the art of microscopy, and especially in the field of near-field scanning optical microscopy, and are not described in detail here.

Figure 3A:
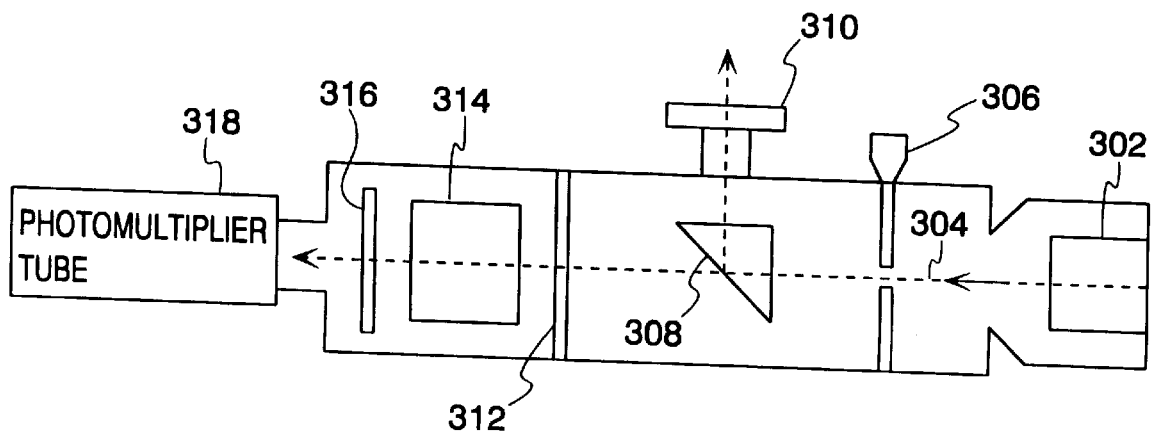
FIG. 3A is a side view of the light detection portion of the present invention.
Figure 3B:
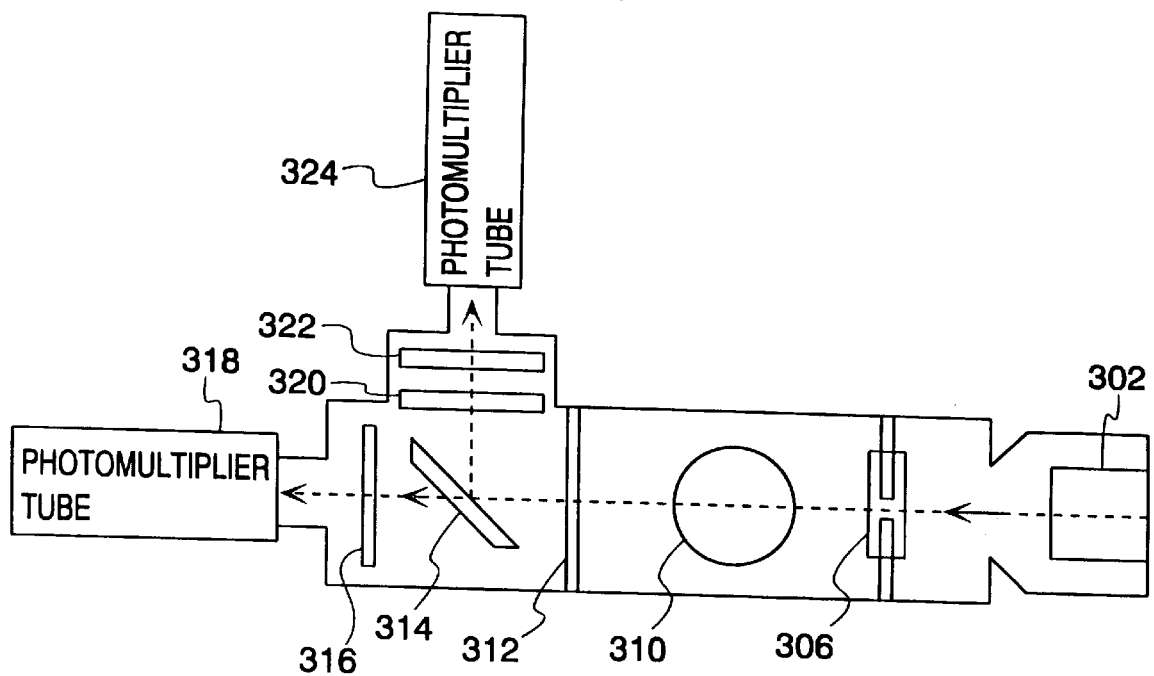
FIG. 3B is a top view of the light detection portion of the present invention.

It may be understood there are various ways in which the illuminating light and fluorescent wavelengths may be separated from one another and individually detected. Turning to FIGS. 3A and 3B, one embodiment of the light detecting portion of the invention is shown in side-view and top-view detail, respectively. Light transmitted through the specimen enters the detection portion through relay lens 302. The light, comprising illuminating light as well as fluorescent light, passes through pin-hole 304, the size of which is selectable by means of selector 306. Such selector 306 may, for example, comprise a rotatable disk with progressively-sized pin-holes in it, a slidable plate with consecutive progressively-sized pin-holes, or an adjustable iris diaphragm or the like. The light is then split at prism 308, which directs at least part of the light to a camera 310. Camera 310 in this embodiment serves where photomultiplier tube 124 was used in FIG. 1, to view the illuminating light for purposes of aligning the confocal means with the probe tip. Prism 308 may be removable so that during scanning, light received in the detection portion of the apparatus is not unnecessarily split into two portions.

Beyond prism 308, the light passes through shutter 312 and encounters a dichroic mirror 314, which tends to separate the light into two beams based on wavelength. The critical wavelength should lie between the wavelengths of the two fluorescent dyes used, so as to split the fluorescent light on the basis of wavelength and dye. For example, an illuminating light wavelength of 488 nanometers (a readily available laser light wavelength) may be used in conjunction with the dye fluorescein and the dye fura red. Fluorescein fluoresces under illumination by 488 nanometer light at 530 nanometer wavelength, and may be used as the dye uniformly distributed in the cell for purposes of determining the separation between the cell surface and the probe tip. Fura red fluoresces under illumination by 488 nanometer light at 650 nanometer wavelength, and may be used as the tagging dye for molecules of interest. The dichroic mirror then would reflect shorter wavelength light, including fluorescein fluorescence at 530 nm and illuminating light at 488 nm, while transmitting the fura red fluorescence at 650 nm.

The use of the dichroic mirror 314 differs from the setup shown in FIG. 1 in that all of the light at the wavelength of interest can be passed to the respective photomultiplier tube, rather than splitting the light strength at all wavelengths using reflective/refractive mirrors 122 and 126.

Light which is passed by the dichroic mirror 314 is further selected on wavelength by bandpass filter 316, and then enters photomultiplier tube 318. In the above example, photomultiplier tube 318 therefore detects fura red fluorescence, yielding a signal indicative of the tagged molecules of interest.

Light which is reflected by the dichroic mirror 314 first passes a notch filter 320 which filters out the wavelength of the illuminating light (488 nanometers in the example). The filtered light then passes through a refining bandpass filter 322 which selects the wavelength of the other fluorescent light component. Photomultiplier 324 detects this fluorescent light amplitude and produces a signal indicative thereof. In the above example, photomultiplier tube 324 therefore detects fluorescein fluorescence, indicative of the distance separating the tip from the cell surface.

It may be understood that other fluorescent dyes may be used, which fluoresce at different wavelengths, and that illumination light of a wavelength different from 488 nm may be used, depending on the requirements for imaging the specimen and molecules of interest therein. Furthermore, it lies within the scope of the present invention to detect uniformly distributed dye fluorescence at photomultiplier tube 318 and tagging dye fluorescence at photomultiplier tube 324, depending on the choice of dyes and the choice of the dichroic mirror.

A further advantage of the invention is the high fidelity with which the confocal light detection means detects light originating in the near-field of the probe tip. Illuminating light diffracts widely in the far-field distant from the probe tip, and can excite fluorescence in dyes lying out of the zone of interest at the cell surface. Widely scattered light and resultant extraneous fluorescence which would otherwise all be gathered by the light detection portion is greatly limited in proportion to the light from the near-field which is gathered using a pin-hole arrangement. The use of a confocal pin-hole light detecting means greatly enhances the accuracy with which a determination of the relative separation of the probe tip and cell surface can be made.

The present invention can be used for scanning microscopy and for monitoring metabolic activity at a location over time. Furthermore, this invention can be used for high-resolution fluorescence microscopy of living biological samples, chemically fixed samples, or even sectional material. The invention achieves a new level of resolution in fluorescence microscopy.

According to one method for employing the apparatus of the present invention for scanning a surface at high resolution, a specimen comprising a cell (which may be living or chemically fixed) is first stained with two fluorescent dyes which can be activated by a single illumination wavelength, but which fluoresce at different wavelengths. One dye is distributed substantially uniformly throughout the cell, and the other dye tags a molecule of interest.

The specimen is placed in the stage and the probe tip, cell, and confocal means are lined up along an axis, using the illumination light signal strength. The tip is moved toward the cell and the signal corresponding to the uniformly distributed dye is monitored until it reaches a maximum, indicating the tip has contacted the cell surface. When the maximum value is achieved it is identified by the observation that signal strength does not increase with further adjustment of the z-position of the tip, but instead levels off. This method of monitoring the point of contact with the cell surface is referred to as "photon-density feedback."

The probe tip is then backed off the cell to a selected distance where the cell surface still lies within the near-field of the cell. This withdrawal of the tip can be determined in two ways. The z-adjust of the tip can be a piezo-electric element, for example, caibrated with displacement so that once it has been determined that the cell surface has been reached, the feed current to the piezo-electric element can be changed to cause the tip to move away a known amount. Alternatively, the signal from the uniformly distributed dye can be monitored and the tip backed off until the signal drops to some selected fractional level of the maximum.

Figure 4:
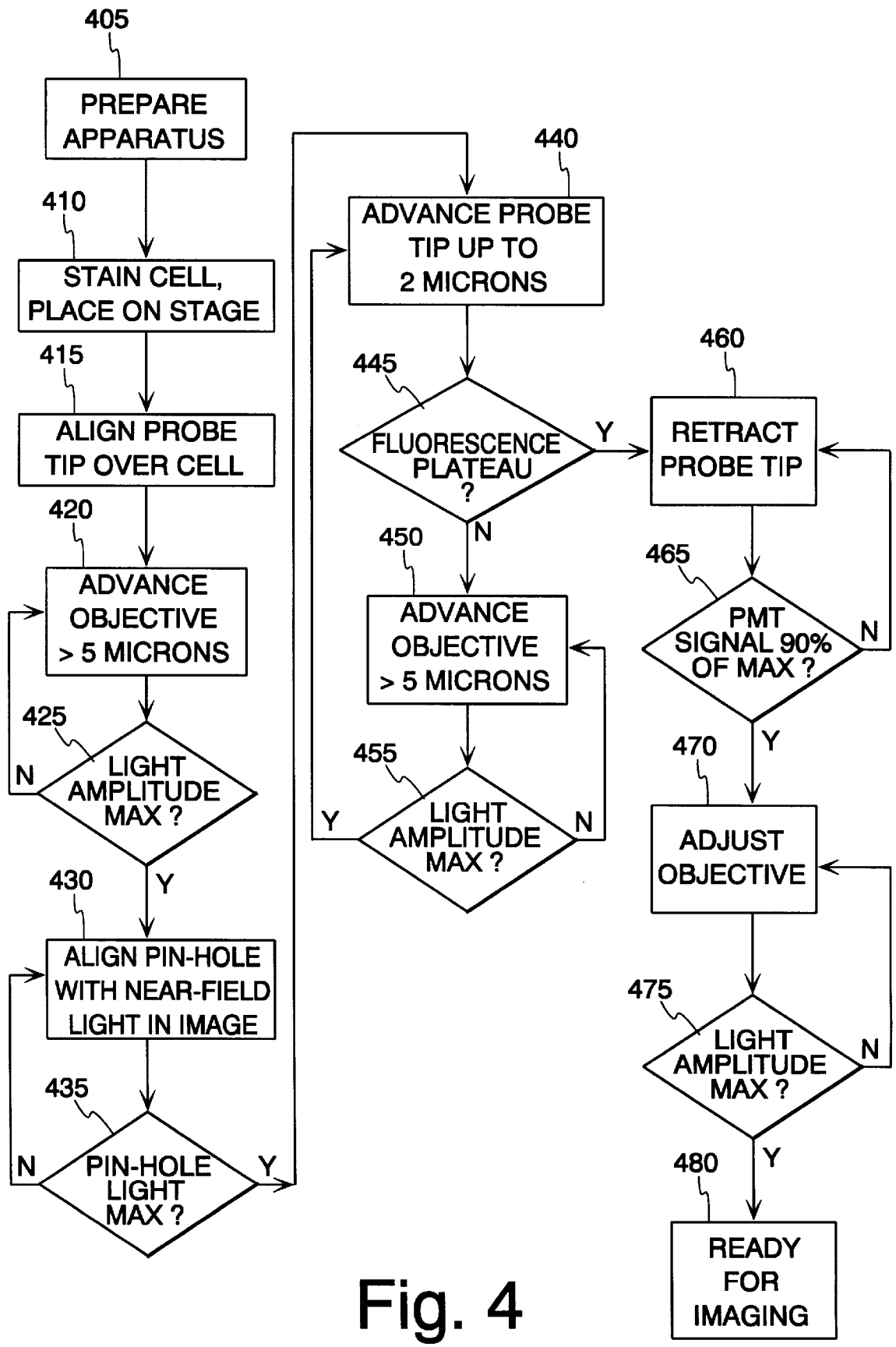
FIG. 4 is a flowchart of a method for use in preparing the apparatus in the present invention.

Turning to FIG. 4, a more specific description of a photon-density method for setting up to perform a raster scan-type image of the cell surface according to the invention is provided by a flow chart. The process starts at step 405 for preparations to perform a scan over a region of the cell surface with an apparatus according to the invention by providing a photodiode for receiving light from the objective of the microscope, and a photomultiplier tube (PMT) for producing a signal indicative of light received through the pin-hole of the confocal means of the microscope. The cell is stained with two dyes in this example at 410, according to methods well known in the art, one dye which pervades the cell relatively uniformly, and one dye which has an affinity specifically for the molecules of interest within the cell.

With light from a bright field source—e.g., a common microscope illumination lamp or the like—the cell is illuminated and the probe tip is aligned over the cell in step 415, by viewing through a camera or eyepiece, for example. Any illumination used for alignment of the probe over the cell is then removed, and light is provided from a light source to the probe tip, which may be laser light or other light. The microscope objective is moved toward a position at which its focal section will be at the probe tip in step 420, in increments over 5 microns, for example, or any other increment which will not significantly overshoot the position at which the focal section of the objective is at the probe tip. After each incremental movement, the photodiode is monitored to determine the amplitude of light received through the objective in step 425. The objective can be moved incrementally in the opposite direction if it is apparent the focal section has overshot the probe tip location, and incremental movement of the objective is stopped when the value of the photodiode indicates a maximum has been reached.

In step 430, the pin-hole is aligned in the projection plane of the objective with the light from the near-field of the probe tip. Alignment is optimized when the value of the signal from a PMT receiving light through the pin-hole reaches a maximum in step 435, as PMT 124 was used in FIG. 1.

Once the objective and pin-hole have been thus aligned, the probe tip is moved toward the cell surface in an increment of up to 2 microns, in step 440, while the output of a PMT for receiving fluorescent light of the cell-pervading dye is monitored in step 445. If the signal from that PMT has not reached a plateau (indicating contact between the tip and cell surface, and dimpling of the cell), and the tip has been moved as much as up to 2 microns, the objective is refocused in steps 450 and 455, as described above with respect to steps 420 and 425. Then, the probe tip is again moved toward the cell surface in an increment of up to 2 microns in step 440.

When a plateau has been reached in the signal from the PMT receiving fluorescent light from the cell-pervading dye in step 445, retraction of the tip is started in step 460. Retraction is continued until the PMT signal has reached 90% of its plateau maximum in step 465. As an alternative, a different fraction of the maximum PMT signal—e.g., 100% or 75%—can be used to retract the probe tip, if a different distance between the probe tip and cell surface is desired. Finally, in steps 470 and 475, the objective is once again readjusted to focus on the focal section of the near-field of light emerging from the probe tip, at the cell surface. As of step 480, the apparatus is ready for scanning of an area of the cell surface, and generation of an image with sub-wavelength resolution.

At the backed-off height, the scanning is then done by moving the position of the stage containing the cell relative to the tip in the x-y plane, readjusting the height of the tip above the cell surface and then recording the value of the tagging dye, to obtain an image over the x-y plane of the distribution of the tagged molecule of interest. If necessary, the objective can be moved with the probe tip to preserve optimal focus. Preferably, the objective is keyed to the movement of the probe tip once the optimal alignment has been obtained.

The scanning is preferably done in a regular fashion, by moving the cell relative to the tip a known and measurable amount, by means of another calibrated piezo-electric element controlling x-position or y-position, for example. A raster scan pattern is most preferable. Each time the relative x-y positions of the tip and cell are changed, the separation between the cell and tip in the z-direction may change, and the z-position of the probe tip is readjusted to maintain the selected height constantly. Regardless of whether the probe tip is backed off from contacting the cell surface using a calibrated piezo-electric element or by reference to a fractional level of fluorescent dye signal, the fluorescent dye signal strength at the backed-off distance is used as a reference point or set point for readjusting the separation between the cell surface and the probe tip throughout the scanning. Furthermore, a three-dimensional map of the cell surface can be generated based on the z-position adjustments in the probe tip as it was scanned over the surface.

It is also contemplated in the present invention that several steps described above in FIG. 4 may be modified or unnecessary in the case that the apparatus is constructed such that the probe tip, objective and pin-hole are pre-aligned, and held in that arrangement by fixed structures. Furthermore, it is contemplated that many or all of the steps for aligning the probe tip, cell, objective and pin-hole can be automated and/or directed from a personal computer.

As alluded to above, the present invention can also be used to measure metabolic processes of a cell over time. Accordingly, the cell need not be stained with two dyes, as the tagging dye may suffice, if it is present in sufficient concentration in the cell to serve both to determine the tip height and for tagging molecules of interest which measure the metabolic process. The above-outlined procedure is followed for aligning the tip, cell and confocal means prior to bringing the tip and cell into contact. Thereafter, the tip is brought down toward the cell surface as also described above. However, since there is no uniformly distributed dye, but only the tagging dye, the signal corresponding to the tagging dye is used to determine when the tip has contacted the cell surface. The strength of the tagging dye fluorescent light signal will also attain a maximum when the probe tip contacts and dimples the cell surface because the tagging dye lies within the cell, and the probe tip can get no closer to the dye to cause further increased fluorescence.

Once the tip has contacted the cell surface, as indicated by photon-density feedback when a maximum tagging dye-fluorescence signal is achieved, the tip is either maintained in this position or is backed off, and thereafter the tagging dye fluorescence signal is monitored over time to generate a time series representing the change over time in tagged molecule concentration in the immediate vicinity of the probe tip with a spatial resolution in the tens-of-nanometers range.

Under some circumstances, it is difficult to use the tagging dye for the determination of contact between the probe tip and the cell surface, as when the metabolic change in tagging dye concentration is much quicker than the temporal resolving power of the microscope, or when the tagging dye is very unevenly distributed in the cell membrane. In this case two dyes may be used just as they are used for spatial scanning. A first dye uniformly pervades the cell and is used as described above to determine contact between the tip and cell surface. The tip is withdrawn to a selected distance, and then the second dye, used to tag molecules of interest, is monitored over time to yield the aforementioned time series indicative of some metabolic process relating to the molecules.

The above description and accompanying drawings provide a clear understanding of the apparatus and method of the present invention. However, the invention contemplates that at least some of the aforementioned parts and steps may be modified or replaced with equivalent parts or steps as would be known or obvious to the artisan in this field and yet the total apparatus or photon-density feedback method would still lie within the scope and spirit of the invention.

Therefore, the invention is most fully described and claimed by the following claims in view of the above specification.

I claim:

1. A near-field microscope for viewing a biological cell containing at least one fluorescent dye comprising:

a light source for providing light for causing the fluorescent dye in the specimen to fluoresce;

a probe having a tip, said probe being disposed to conduct the light from the light source through the probe and out the tip;

means for adjusting the position of the tip with respect to the cell, disposed to bring the tip into immediate proximity with a surface of the cell;

means for receiving light, including fluorescent light from the fluorescent dye in the cell, coming from an electromagnetic near-field of the light emanating from the tip, disposed to generate a signal indicative of the strength of the fluorescent light which is received;

photon-density feedback means responsive to the fluorescent light signal disposed to register a value corresponding to the signal strength, indicative of the distance between the tip and the cell, for causing the position-adjusting means to withdraw the tip away from the surface of the cell to a height at which the surface is still substantially in said near-field, when a desired signal strength is registered.

2. A microscope according to claim 1, wherein said feedback means is disposed to cause the position-adjusting means to withdraw the tip from the cell surface to said height when a maximum value of the signal strength is registered indicative of contact between the tip and the cell.

3. A microscope according to claim 2, wherein the tip has an aperture for emanating light from the light source, said aperture having a size less than one-half the wavelength of the light.

4. A microscope according to claim 3, wherein said feedback means further causes the position-adjusting means to maintain the tip at said height above the cell based on the fluorescent light signal strength, as the tip is scanned over the surface of the cell.

5. A microscope according to claim 4, for viewing a biological cell containing at least a first fluorescent dye with a first fluorescent wavelength and a second fluorescent dye with a second fluorescent wavelength, wherein illumination by light from the light source emanating from the tip causes fluorescence of both dyes, and further wherein the light-receiving means is disposed to receive said second fluorescent light from said near-field and produce a second signal indicative of the strength of the second fluorescent light received, and further comprising an imaging means for producing an image of at least a part of the cell from the strength of the second fluorescent light signal as a function of the relative position of the tip with respect to the cell.

6. A microscope according to claim 5, further comprising a confocal means for selectively allowing light coming from said near-field to be received by the light receiving means and selectively preventing light coming from any other location from being so received.

7. A microscope according to claim 6, wherein the confocal means comprises:

an objective for receiving light from the cell and projecting an image of a portion of the cell onto a projection plane; and a confocal aperture positionable within said projection plane, having about the same size as the projection of the aperture in said tip, for passing a portion of light from said projection plane to said light receiving means.

8. A microscope according to claim 6, further comprising means for adjusting the position of the confocal means relative to the position of the tip for optimizing the selectivity of the confocal means for light from said near-field.

9. A microscope according to claim 2, wherein the photon-density feedback means is disposed to determine said height by causing the position-adjusting means to withdraw the tip until the fluorescent light signal decreases to a desired fraction of said maximum.

10. A microscope according to claim 2, wherein the photon-density feedback means is disposed to determine said height by causing the position-adjusting means to withdraw the tip a precalibrated distance when the fluorescent light signal reaches a maximum.

11. A microscope according to claim 1, further comprising a monitoring means responsive to at least one fluorescent light signal generated by the light detecting means for recording the value of the fluorescent light signal as a function of the passage of time.

12. A microscope according to claim 11, for viewing a biological cell containing at least a first fluorescent dye with a first fluorescent wavelength and a second fluorescent dye with a second fluorescent wavelength, wherein illumination by light from the light source emanating from the tip causes fluorescence of both dyes, and further wherein the light-receiving means is disposed to receive said second fluorescent light from said near-field and produce a second signal indicative of the strength of the second fluorescent light received, and further wherein the monitoring means is disposed to register the second fluorescent light signal as a function of the passage of time.

13. An improved near-field microscope for viewing a living biological cell containing at least two fluorescent dyes, including a distributed dye and a tagging dye, comprising:

a light source for generating illumination light comprised of selected wavelengths and for causing the fluorescent dyes to fluoresce;

a fiber optic waveguide having a tapering tip with an aperture therein for conducting illumination light from the light source out the aperture, said aperture having a size substantially smaller than any of said selected illumination light wavelengths;

a stage for holding the cell;

z-adjust means for adjusting the height of the tip relative to the cell along a vertical z-axis;

confocal means for receiving light from the region of the electromagnetic near-field of the illumination light emanating from the tip aperture;

detection means disposed to receive a portion of the light received by the confocal means, responsive to the wavelength of the distributed fluorescent dye for generating a signal indicative of the amount of distributed dye fluorescence received from said near-field region;

feedback means responsive to the distributed dye signal disposed to cause the z-adjust means to increase the height of the tip above the cell once the distributed dye signal has reached a maximum value.

14. A microscope according to claim 13, further comprising an x-y-adjust means for adjusting the location of the tip relative to the cell in an x-y plane normal to said z-axis.

15. A microscope according to claim 14, wherein said photon-density feedback means is further disposed to continuously monitor the distributed dye signal and cause the z-adjust means to maintain the tip at a constant height above the cell based on the said distributed dye signal as x-y-adjust means scans the tip over the cell, and further comprising:

a second detection means disposed to receive a portion of the light received by the confocal means, responsive to the wavelength of the tagging fluorescent dye for generating a signal indicative of the amount of tagging dye fluorescence received from said near-field region;

imaging means for registering the value of said tagging dye signal as x-y-adjust means scans the tip over the cell, for generating an image of the cell from the tagging dye signal as a function of tip position.

16. A microscope according to claim 15, further comprising a third detection means disposed to receive a portion of the light received by the confocal means, responsive to any of the wavelengths of the illuminating light for generating a signal indicative of the amount of illuminating light received by the confocal means.

17. A microscope according to claim 16, wherein said confocal means comprises:

an objective for receiving light from the cell and projecting an image of a portion of the cell onto a projection plane; and a confocal aperture positionable within the projection plane, having about the same size as the projection of the aperture in said tip, for passing a portion of light from said projection plane to said light receiving means.

18. A microscope according to claim 17, wherein the distributed dye detection means and the tagging dye detection means comprise photomultiplier tubes.

19. A microscope according to claim 18, wherein the illuminating light detection means comprises one of the set of a photomultiplier tube, a photodiode, an optical eyepiece, and a camera.

20. A photon-density feedback method of determining the separation between a near-field confocal microscope light-conducting probe tip and the surface of a living biological cell containing a fluorescent dye, comprising the steps of:

introducing illumination light capable of causing said fluorescent dye to fluoresce into the probe;

moving the probe tip toward the cell;

monitoring the amount of fluorescent light coming from the electromagnetic near-field of the probe tip as a function of movement toward the cell; and defining the location of the probe tip to be in contact with the cell surface at the location at which the monitored fluorescent light amount entered a plateau as a function of movement toward the cell.

21. A method according to claim 20, further comprising the steps of:

calibrating the response of a vertical-displacement piezo-electric device to electrical signal with vertical displacement; and employing the calibrated piezo-electric device to move the probe tip away from the cell once the location of contact between the probe tip and cell surface has been defined.

22. A method according to claim 20, further comprising the steps of:

moving the probe tip away from the cell surface once the location of contact between the probe tip and cell surface has been defined; and monitoring the fluorescent light amount as a fraction in comparison to the maximum amount of fluorescent light monitored at said defined location of contact as an indication of separation between the probe tip and cell surface.

23. A method of generating an image of a living biological cell comprising the steps of:

staining a cell with a first fluorescent dye having a first fluorescent wavelength, which distributes substantially uniformly throughout the cell;

staining the cell with a second fluorescent dye having a second fluorescent wavelength, which preferentially attaches to a type of molecule of interest;

mounting the cell in a stage containing a solution capable of maintaining the cell in a living state;

providing illumination light capable of causing both first and second fluorescent dyes to fluoresce;

directing said illumination light into a light-conducting probe having a tip with an aperture for emitting the light;

moving said probe tip relatively toward the cell;

monitoring the amount of fluorescent light of said first wavelength coming from the near-field of said probe tip;

retracting said probe tip relatively from the cell once the monitored amount of fluorescent light of said first wavelength attains a maximum value which does not increase as the probe tip is moved relatively toward the cell, indicating contact between the probe tip and the cell;

registering the amount of fluorescent light of said first wavelength at the retracted location;

moving the probe tip relatively to successive positions across the cell surface;

adjusting the separation between the cell and probe tip relatively at said successive positions so that the amount of fluorescent light of said first wavelength coming from the near-field of the probe tip remains substantially equal to said registered amount; and recording the amount of fluorescent light of said second wavelength coming from the near-field of the probe tip at said successive positions.

24. A method according to claim 23, further comprising the step of:

calibrating the response of a vertical-displacement piezo-electric device to electrical signal with vertical displacement; and wherein said retracting step and said separation adjusting step comprise employing said piezo-electric device to move the probe tip relative to the cell.

25. A method according to claim 24, further comprising the step of recording the vertical displacement of the piezo-electric device at said successive positions after each separation adjustment.

26. A method according to claim 23, further comprising the steps of:

focusing an objective on a focal section containing the near-field of the probe tip to yield an image of the focal section at a projection plane;

positioning a confocal aperture within said projection plane at a location corresponding to the image of the near-field of the probe tip in the projection plane to selectively allow substantially only light from the near-field to pass through the confocal aperture; and wherein said steps for monitoring, registering and recording fluorescent light amounts are performed on light passing through said confocal aperture.

27. A method according to claim 26, further comprising the steps of:

splitting the light passing through said confocal aperture into a first beam and a second beam;

filtering the first beam to selectively allow substantially only light of said first fluorescent wavelength: to pass through;

filtering the second beam to selectively allow substantially only light of said second fluorescent wavelength to pass through; and wherein said steps for monitoring and registering fluorescent light amounts of said first wavelength are performed on said first filtered beam and said step of recording the amount of fluorescent light of said second wavelength is performed on said second filtered beam.

* * * * *

UNITED STATES PATENT AND TRADEMARK OFFICE
CERTIFICATE OF CORRECTION

PATENT NO. : 5,874,726
DATED : February 23, 1999
INVENTOR(S) : Haydon

It is certified that error appears in the above-identified patent and that said Letters Patent is hereby corrected as shown below:

Title page, Item [54] after "CONFOCAL" insert --MICROSCOPE--.

Title page, after "Foundation" insert --Inc.--.

Claim 13, Column 15, Line 44, change "out the" to --out of the--.

Claim 27, Column 18, Line 31, after "wavelength" delete ":" (colon).

Signed and Sealed this

Second Day of January, 2001

Attest:

Attesting Officer

Q. TODD DICKINSON

Commissioner of Patents and Trademarks